United States Patent
Aida

(10) Patent No.: US 9,549,413 B2
(45) Date of Patent: Jan. 17, 2017

(54) CONTROL APPARATUS, COMMUNICATION APPARATUS, COMMUNICATION METHOD AND PROGRAM

(71) Applicant: NEC CORPORATION, Tokyo (JP)

(72) Inventor: Takafumi Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 91 days.

(21) Appl. No.: 14/388,203

(22) PCT Filed: Mar. 28, 2013

(86) PCT No.: PCT/JP2013/059328
§ 371 (c)(1),
(2) Date: Sep. 25, 2014

(87) PCT Pub. No.: WO2013/147053
PCT Pub. Date: Oct. 3, 2013

(65) Prior Publication Data
US 2015/0327285 A1 Nov. 12, 2015

(30) Foreign Application Priority Data
Mar. 30, 2012 (JP) .................................. 2012-081654

(51) Int. Cl.
*H04L 12/28* (2006.01)
*H04W 72/10* (2009.01)
(Continued)

(52) U.S. Cl.
CPC .............. *H04W 72/10* (2013.01); *H04L 45/22* (2013.01); *H04L 45/54* (2013.01); *H04L 47/20* (2013.01); *H04L 45/308* (2013.01)

(58) Field of Classification Search
None
See application file for complete search history.

(56) References Cited

U.S. PATENT DOCUMENTS

| 7,826,393 | B2 | 11/2010 | Okita et al. | |
|---|---|---|---|---|
| 2002/0143914 | A1* | 10/2002 | Cihula | H04L 41/0893 709/223 |

(Continued)

FOREIGN PATENT DOCUMENTS

| JP | 2004-236030 A | 8/2004 |
|---|---|---|
| JP | 2008-060692 A | 3/2008 |

(Continued)

OTHER PUBLICATIONS

Minlan Yu et al: "Scalable flow-based networking with DIFANE", Computer Communication Review, ACM, New York, NY, US, val. 41, No. 4, Aug. 30, 2010 (Aug. 30, 2010), pp. 351-362, XP058004897.

(Continued)

*Primary Examiner* — Chi H Pham
*Assistant Examiner* — Fahmida Chowdhury
(74) *Attorney, Agent, or Firm* — McGinn IP Law Group, PLLC

(57) ABSTRACT

A communication apparatus selects, among a plurality of control information, the control information matching a packet received and which is highest in a priority level. The communication apparatus processes a packet received based on the selected control information. The control apparatus includes a control information generation unit that generates a plurality of control information having match conditions overlapping at least partially one with another, a ranking in a priority level different one from another and processing contents different one from another, and a control unit that sets the plurality of control information in the communication apparatus. The communication apparatus performs the processing of modifying the control information, among the plurality of control information, which is highest in a priority level, based on a modifying condition previously set (Continued)

on the control information basis. Communication policies may be changed over by modifying the priority level.

9 Claims, 12 Drawing Sheets

(51) Int. Cl.
    *H04L 12/813*     (2013.01)
    *H04L 12/707*     (2013.01)
    *H04L 12/741*     (2013.01)
    *H04L 12/725*     (2013.01)

(56) References Cited

U.S. PATENT DOCUMENTS

| | | |
|---|---|---|
| 2008/0056161 A1 | 3/2008 | Okita et al. |
| 2008/0186971 A1* | 8/2008 | Carmichael .......... C07D 217/08 370/392 |
| 2009/0059791 A1* | 3/2009 | Saxena ............... H04L 41/0896 370/235 |
| 2012/0039338 A1 | 2/2012 | Morimoto |
| 2012/0195201 A1* | 8/2012 | Ishikawa ............. H04L 41/0896 370/235.1 |

FOREIGN PATENT DOCUMENTS

| | | |
|---|---|---|
| JP | 2010-287932 A | 12/2010 |
| JP | 2011-170718 A | 9/2011 |
| JP | 2012-39188 A | 2/2012 |
| JP | 2014-506021 A | 3/2014 |
| JP | 2014-526812 A | 10/2014 |
| WO | WO 2011/083668 A1 | 7/2011 |
| WO | WO 2012/020564 A1 | 2/2012 |
| WO | WO 2012/111051 A1 | 8/2012 |
| WO | WO 2013/042373 A1 | 3/2013 |

OTHER PUBLICATIONS

Extended European Search Report dated Nov. 30, 2015.
International Search Report (ISR) (PCT Form PCT/ISA/210), in PCT/JP2013/059328, dated Jun. 25, 2013.
Nick McKeown and seven others, "OpenFlow: Enabling Innovation in Campus Networks", [online], [retrieved Heisei24 (2012) Feb. 14], Internet <URL: http://www.openflow.org/documents/openflow-wp-latest.pdf>.
"OpenFlow Switch Specification" Version 1.1.0 Implemented (Wire Protocol 0x02), [online], [retrieved Heisei24 (2012) Feb. 14], Internet <URL: http://www.openflow.org/documents/openflow-spec-v1.1.0pdf>.
Japanese Office Action dated Dec. 22, 2015 with a partial English translation thereof.

* cited by examiner

FIG. 4

| MATCH CONDITIONS | CONDITIONS FOR DELETION | ACTIONS |
|---|---|---|
| | | |
| | | |
| | | |

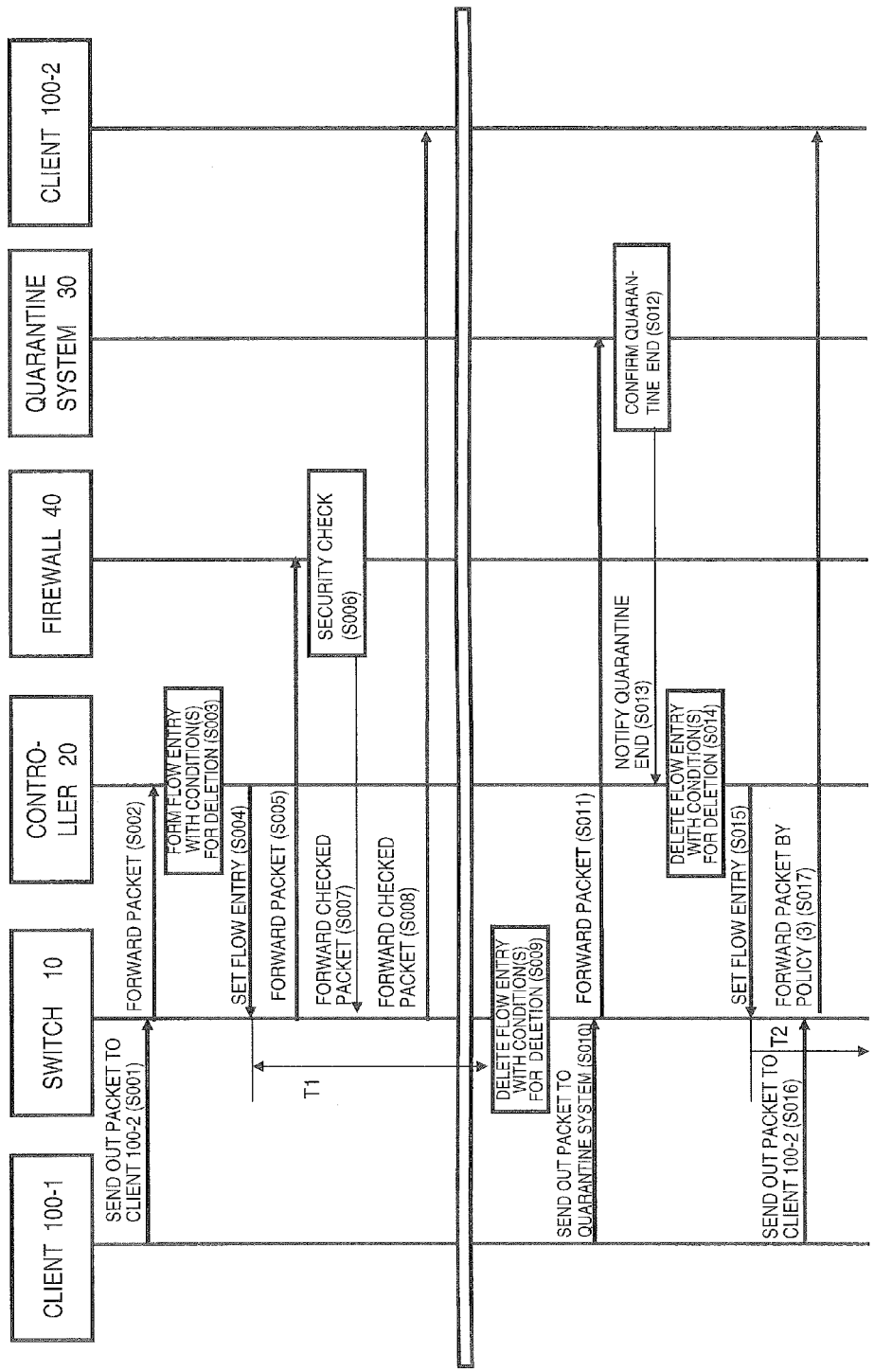

FIG. 6

FLOW TABLE 12-1

| | MATCH CONDITIONS | | CONDITION(S) FOR DELETION | ACTIONS |
|---|---|---|---|---|
| INPUT PORT | SENDING SOURCE MAC ADDRESS | DESTINATION MAC ADDRESS | | |
| FIREWALL EGRESS | * | * | - | TO FLOW TABLE 12-2 | f0

FLOW TABLE 12-2

| | MATCH CONDITIONS | | CONDITION(S) FOR DELETION | ACTIONS | |
|---|---|---|---|---|---|
| INPUT PORT | SENDING SOURCE MAC ADDRESS | DESTINATION MAC ADDRESS | | | |
| * | * | CLIENT 100-1 | - | FORWARD TO CLIENT 100-1 | f01 |
| * | * | CLIENT 100-2 | - | FORWARD TO CLIENT 100-2 | f02 |
| * | * | QUARANTINE SYSTEM | - | FORWARD TO QUARANTINE SYSTEM | f03 |

FIG. 7

FLOW TABLE 12-1

| | MATCH CONDITIONS | | | CONDITION(S) FOR DELETION | ACTIONS | |
|---|---|---|---|---|---|---|
| INPUT PORT | SENDING SOURCE MAC ADDRESS | DESTINATION MAC ADDRESS | | | | |
| FIREWALL EGRESS | * | * | | - | TO FLOW TABLE 12-2 | f0 |
| * | CLIENT 100-1 | * | | TIME T1 HAS ELAPSED | FORWARD TO FIREWALL INLET | f1 |
| * | CLIENT 100-1 | QUARANTINE SYSTEM | | - | FORWARD TO QUARANTINE SYSTEM | f2 |
| * | CLIENT 100-1 | * | | - | DROP | f3 |

FLOW TABLE 12-2

| | MATCH CONDITIONS | | CONDITION(S) FOR DELETION | ACTIONS | |
|---|---|---|---|---|---|
| INPUT PORT | SENDING SOURCE MAC ADDRESS | DESTINATION MAC ADDRESS | | | |
| * | * | CLIENT 100-1 | - | FORWARD TO CLIENT 100-1 | f01 |
| * | * | CLIENT 100-2 | - | FORWARD TO CLIENT 100-2 | f02 |
| * | * | QUARANTINE SYSTEM | - | FORWARD TO QUARANTINE SYSTEM | f03 |

FIG. 8

FLOW TABLE 12-1

| INPUT PORT | MATCH CONDITIONS | | CONDITION(S) FOR DELETION | ACTIONS |
| --- | --- | --- | --- | --- |
| | SENDING SOURCE MAC ADDRESS | DESTINATION MAC ADDRESS | | |
| FIREWALL EGRESS | * | * | - | TO FLOW TABLE 12-2 |
| * | CLIENT 100-1 | QUARANTINE SYSTEM | - | FORWARD TO QUARANTINE SYSTEM |
| * | CLIENT 100-1 | * | - | DROP | f0, f2, f3

FLOW TABLE 12-2

| INPUT PORT | MATCH CONDITIONS | | CONDITION(S) FOR DELETION | ACTIONS |
| --- | --- | --- | --- | --- |
| | SENDING SOURCE MAC ADDRESS | DESTINATION MAC ADDRESS | | |
| * | * | CLIENT 100-1 | - | FORWARD TO CLIENT 100-1 |
| * | * | CLIENT 100-2 | - | FORWARD TO CLIENT 100-2 |
| * | * | QUARANTINE SYSTEM | - | FORWARD TO QUARANTINE SYSTEM | f01, f02, f03

FIG. 9

FLOW TABLE 12-1

| | MATCH CONDITIONS | | | CONDITION(S) FOR DELETION | ACTIONS |
|---|---|---|---|---|---|
| | INPUT PORT | SENDING SOURCE MAC ADDRESS | DESTINATION MAC ADDRESS | | |
| f0 | FIREWALL EGRESS | * | * | - | TO FLOW TABLE 12-2 |
| f4 | * | CLIENT 100-1 | * | TIME T2 HAS ELAPSED | TO FLOW TABLE 12-2 |

FLOW TABLE 12-2

| | MATCH CONDITIONS | | | CONDITION(S) FOR DELETION | ACTIONS |
|---|---|---|---|---|---|
| | INPUT PORT | SENDING SOURCE MAC ADDRESS | DESTINATION MAC ADDRESS | | |
| f01 | * | * | CLIENT 100-1 | - | FORWARD TO CLIENT 100-1 |
| f02 | * | * | CLIENT 100-2 | - | FORWARD TO CLIENT 100-2 |
| f03 | * | * | QUARANTINE SYSTEM | - | FORWARD TO QUARANTINE SYSTEM |

FIG. 11

| | MATCH CONDITIONS | | | CONDITION(S) FOR DELETION | ACTIONS |
|---|---|---|---|---|---|
| INPUT PORT | SENDING SOURCE MAC ADDRESS | DESTINATION MAC ADDRESS | | | |
| * | * | CLIENT 100-1 | | - | FORWARD TO CLIENT 100-1 |
| * | * | CLIENT 100-2 | | - | FORWARD TO CLIENT 100-2 |
| * | CLIENT 100-2 | GATEWAY | | - | FORWARD TO GATEWAY | f11, f12, f13

FIG. 12

| | MATCH CONDITIONS | | CONDITION(S) FOR DELETION | ACTIONS |
|---|---|---|---|---|
| INPUT PORT | SENDING SOURCE MAC ADDRESS | DESTINATION MAC ADDRESS | | |
| * | CLIENT 100-1 | GATEWAY | B1 BYTES PASSED | FORWARD TO GATEWAY |  
| * | CLIENT 100-1 | GATEWAY | B2 BYTES PASSED | FORWARD TO GATEWAY AS BANDWIDTH IS LIMITED TO S1 bps |
| * | CLIENT 100-1 | GATEWAY | TIME T3 ELAPSED AS FROM MATCH | FORWARD TO GATEWAY AS BANDWIDTH IS LIMITED TO S2 bps AND PROCESSING PRIORITY IS SET TO LOW |
| * | * | CLIENT 100-1 | - | FORWARD TO CLIENT 100-1 |
| * | * | CLIENT 100-2 | - | FORWARD TO CLIENT 100-2 |
| * | CLIENT 100-2 | GATEWAY | - | FORWARD TO GATEWAY |

Rows labeled: f5, f6, f7, f11, f12, f13

CONTROL APPARATUS, COMMUNICATION APPARATUS, COMMUNICATION METHOD AND PROGRAM

REFERENCE TO RELATED APPLICATION

This application is based upon and claims the benefit of the priority of Japanese Patent Application No. 2012-081654 filed on Mar. 30, 2012, the disclosure of which is incorporated herein in its entirety by reference thereto.

TECHNICAL FIELD

This invention relates to a control apparatus, a communication apparatus, a communication method and a program and, more particularly, to a control apparatus that exercises centralized control over communication apparatuses placed under its supervision, a communication apparatus controlled by the control apparatus, a communication method, and a program.

BACKGROUND

Recently, a network called an OpenFlow is attracting the attention (see Patent Literature 1 and Non Patent Literatures 1, 2). The OpenFlow uses a centralized control type network architecture in which a control apparatus termed an OpenFlow controller controls the behavior of a switch termed an OpenFlow switch. With the OpenFlow, it is possible to flexibly modify the behavior of switches, together making up a virtual network, in keeping with the status of the network in its entirety. Thus, with the use of the OpenFlow, a virtual network high in flexibility can be constructed with much ease.

On the other hand, a network management system (NMS) or a policy server is used in a network system in order to exercise monistic control over security, service quality or otherwise in a network system.

In Patent Literature 2, there is disclosed a management computer that generates the port setting information (paragraphs 0043, 0044 and 0062). The port setting information provides for the information on whether or not each port provided in each switch is to carry out the client authentication function based on the setting policy and the network configuring information. This setting policy provides for a switch or a port which does not automatically set whether client authentication is to be performed. In the Patent Literature, it is stated that the management computer generates the configuration definition based on the port setting information 1140 and causes it to be reflected in the switch as necessary (see paragraphs 0029 and 0063).

In Patent Literature 3, there is disclosed a policy management system including a polling means and a trap means, configured for monitoring the network, and a policy application instruction means, configured for correcting the policy as necessary. In Patent Literature 4, there is disclosed a quarantine network system which enlarges the possible accessing range stepwise as security check goes on.

[PATENT LITERATURE 1]
Japanese Patent Kokai Publication No. JP-P2011-170718A
[PATENT LITERATURE 2]
Japanese Patent Kokai Publication No. JP-P2008-060692A
[PATENT LITERATURE 3]
Japanese Patent Kokai Publication No. JP-P2004-236030A
[PATENT LITERATURE 4]
Japanese Patent Kokai Publication No. JP-P2010-287932A
[NON-PATENT LITERATURE 1]
Nick McKeown and seven others, "OpenFlow: Enabling Innovation in Campus Networks", [online], [retrieved Heisei24 (2012) February 14], Internet <URL: http://www.openflow.org/documents/openflow-wp-latest.pdf>
[NON-PATENT LITERATURE 2]
"OpenFlow Switch Specification" Version 1.1.0 Implemented (Wire Protocol 0x02), [online], [retrieved Heisei24 (2012) February 14], Internet <URL: http://www.openflow.org/documents/openflow-spec-v1.1.0pdf>

SUMMARY

The following analysis is given by the present invention. It is now supposed that, in a centralized control type system, as disclosed in Patent Literature 1 and Non Patent Literatures 1, 2, such dynamic control is exercised in which the behavior of individual apparatuses is modified, with the occurrence of a certain event as a trigger, as in Patent Literature 3 or 4. In such case, it is necessary to monitor the status of the apparatuses or to perform individual control consistent with monitored results. In the example of Patent Literature 1, such individual control is the modifying of the 'flow entry'.

Hence, there arises a problem that, if the number of apparatuses to be supervised increases, the load imposed on a control apparatus which exercises centralized control on these apparatuses, such as the controller of Patent Literature 1 or the management computer of Patent Literature 2, also increases. The frequency with which the status of these apparatuses is monitored may be among the possible causes of such increased load on the control apparatus. If the frequency with which the status of these apparatuses is monitored is decreased, or the contents of the control are merely stereotyped, it might be possible to suppress the load on the control apparatus from increasing. However, in such case, the merit proper to the communication system represented by Patent Literature 1, that is, meticulous control for the apparatuses, will be lost.

It is therefore an object of the present invention to provide a control apparatus, a communication apparatus, a communication method and a program, which contribute to realization of fine individual control for apparatuses being supervised without regard to the number of the apparatuses being controlled.

Solution to Problem

In a first aspect, there is provided a control apparatus comprising a control information generation unit that generates a plurality of control information pieces having match conditions overlapping at least partially one with another, a ranking in a priority level different one from another and processing contents different one from another, and a control unit. The control unit sets the plurality of control information pieces in a communication apparatus. The communication apparatus selects, among the plurality of information pieces, the control information piece matching a packet received and having a match condition highest in a priority level, and processes a received packet based on the selected control information piece. The control apparatus causes the communication apparatus to modify the control information piece, highest in a priority level, among the plurality of control information pieces, based on a modifying condition set in advance on the control information piece basis, so as to change over communication policies.

In a second aspect, there is provided a communication apparatus comprising a packet processing unit that selects, among a plurality of control information pieces, such control information piece matching a packet received and having a match condition highest in a priority level, and processes a received packet based on the selected control information piece, and a control information piece management unit. The control information piece management unit modifies the control information piece, among the plurality of control information pieces, which is highest in a priority level, based on a condition specified in advance by the control apparatus, so as to change over communication policies.

In a third aspect, there is provided a method for communication comprising a step of generating a plurality of control information pieces having match conditions overlapping at least partially one with another, a ranking in a priority level different one from another and processing contents different one from another, a step of setting the plurality of control information pieces in a communication apparatus, which communication apparatus selects, among the plurality of control information pieces, the control information piece matching a packet received and having the match condition highest in a priority level, and processes a received packet based on the selected control information piece, and a step of specifying, for the communication apparatus, in advance, a condition to modify the control information piece having a highest priority level among the plurality of control information pieces. The present method is bound up with a specified machine which is a control apparatus that exercises centralized control over communication apparatuses which are under its supervision.

In a fourth aspect, there is provided a program that accomplishes respective functions of the above mentioned control and communication apparatuses. The program can be recorded on a computer readable, that is, non-transient, recording medium. That is, the present invention may be in the form of a computer program product.

Advantageous Effects of Invention

According to the present invention, it is possible to contribute to accomplishing meticulous individual control of target apparatuses without being subject to constraints including the number of apparatuses placed under control, the monitoring frequency or otherwise.

BRIEF DESCRIPTION OF DRAWINGS

In a third aspect, there is provided a method for communication comprising a step of generating a plurality of control information pieces having match conditions overlapping at least partially one with another, a ranking in a priority level different one from another and processing contents different one from another, a step of setting the plurality of control information pieces in a communication apparatus, which communication apparatus selects, among the plurality of control information pieces, the control information piece matching a packet received and having the match condition highest in a priority level, and processes a received packet based on the selected control information piece, and specifying, for the communication apparatus, in advance, a condition to modify the control information piece having a highest priority level among the plurality of control information pieces. The present method is bound up with a specified machine which is a control apparatus that exercises centralized control over communication apparatuses which are under its supervision.

In a fourth aspect, there is provided a program that accomplishes respective functions of the above mentioned control and communication apparatuses. The program can be recorded on a computer readable, that is, non-transient, recording medium. That is, the present invention may be in the form of a computer program product.

According to the present invention, it is possible to contribute to accomplishing meticulous individual control of target apparatuses without being subject to constraints including the number of apparatuses placed under control, the monitoring frequency or otherwise.

BRIEF DESCRIPTION OF THE DRAWINGS

Figure 1:
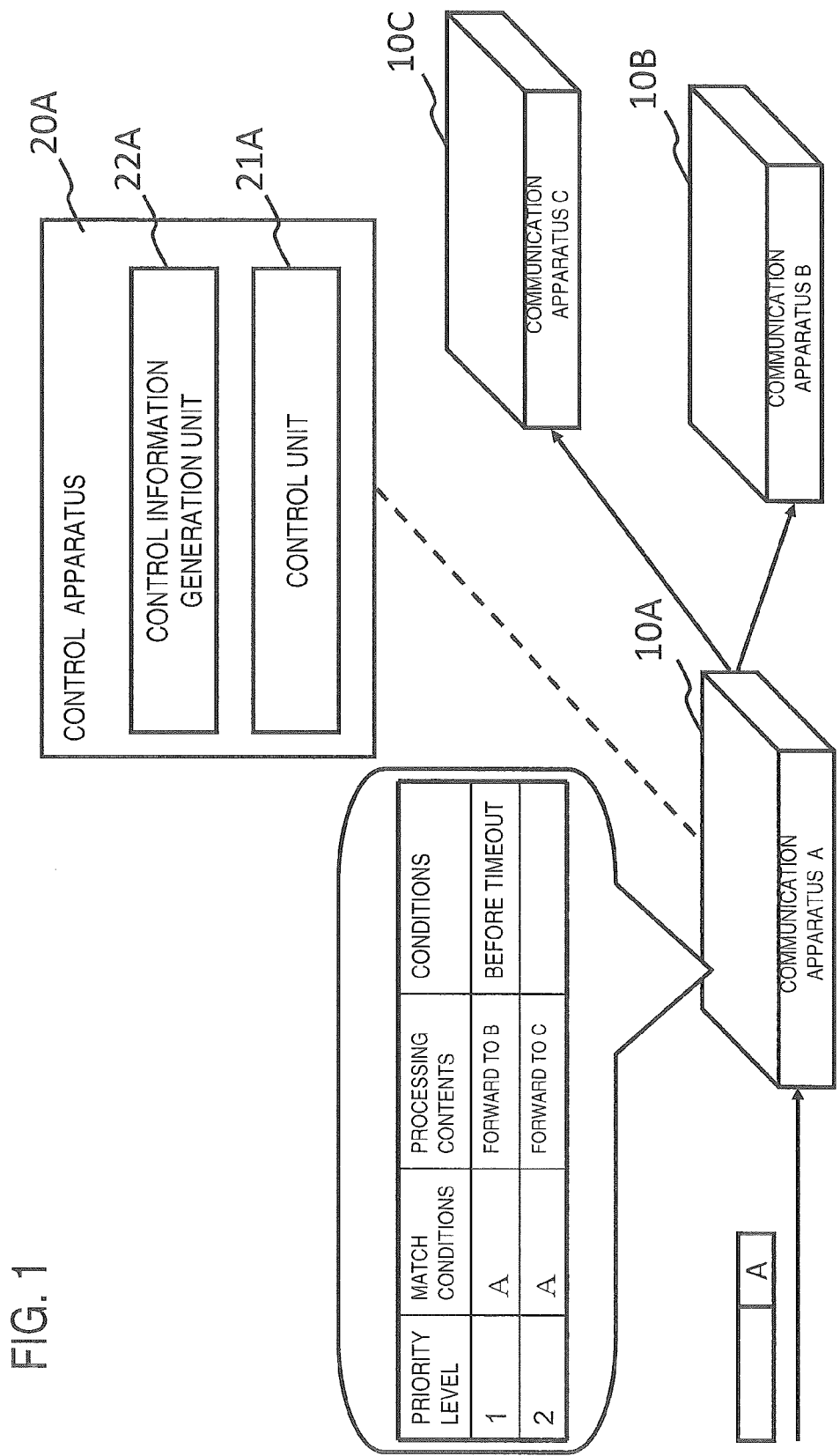

FIG. 1 is a schematic view showing a configuration of an exemplary embodiment 1.

Figure 2:
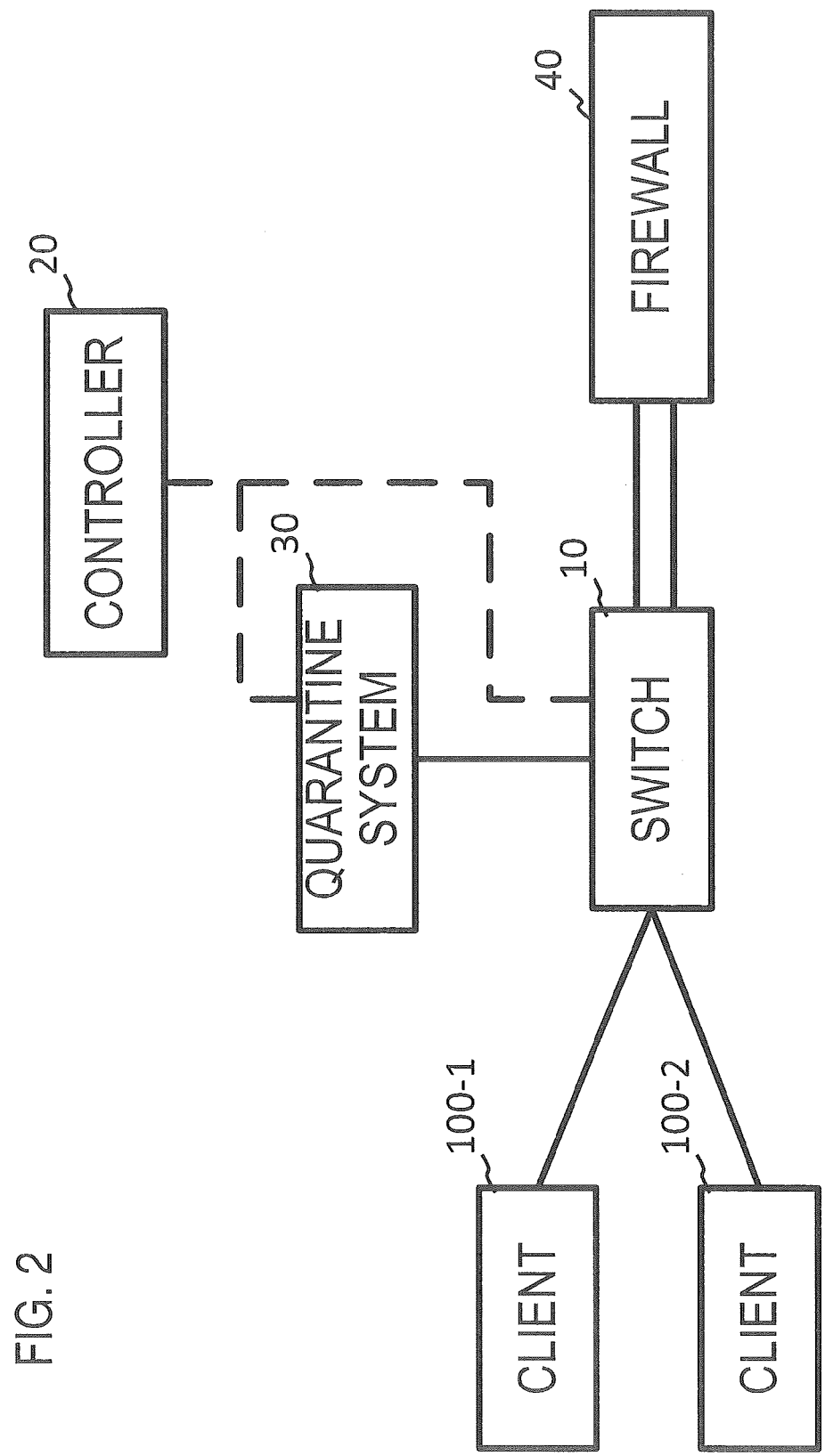

FIG. 2 is a block diagram showing a global configuration of the exemplary embodiment 1.

Figure 3:
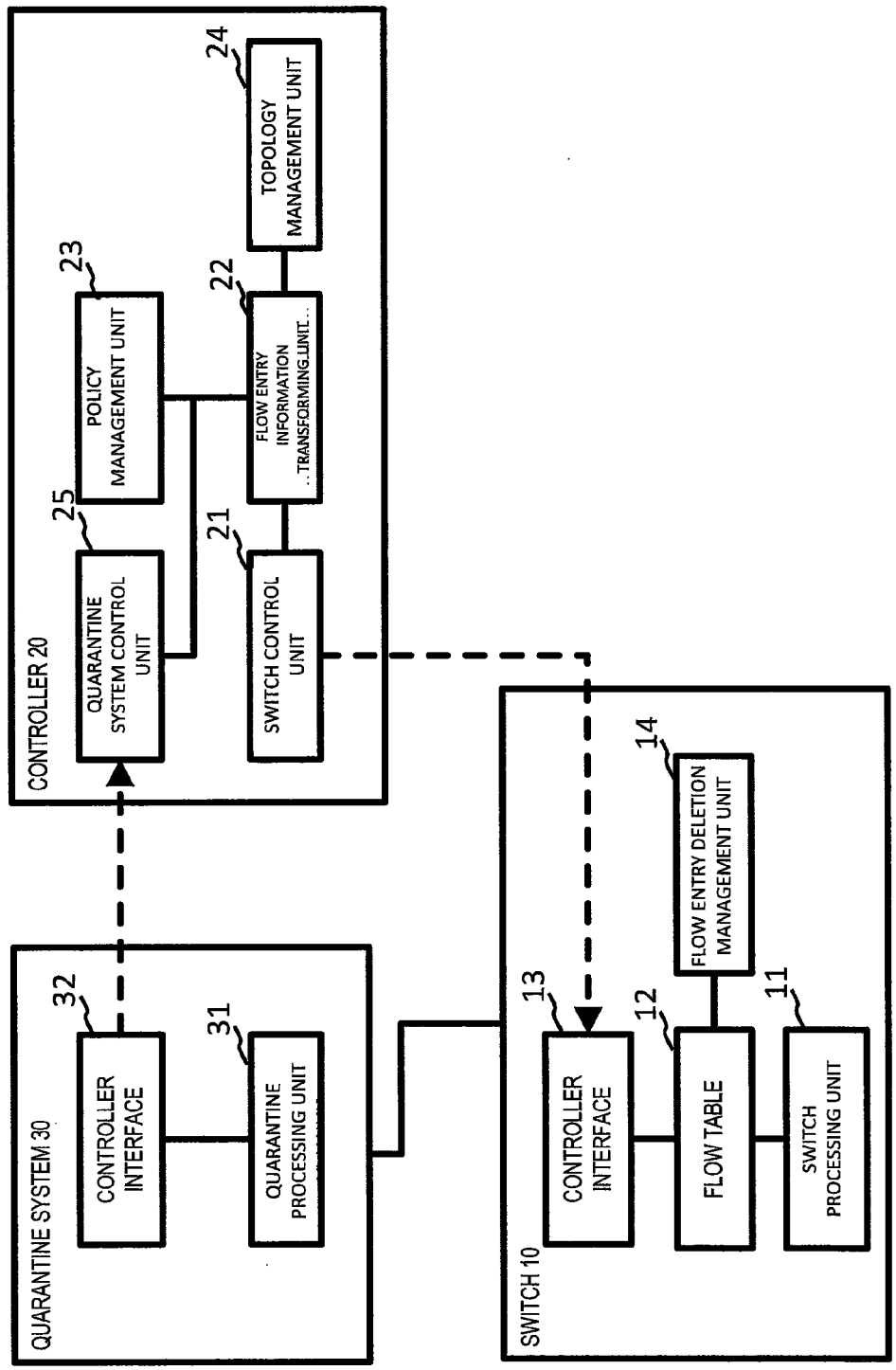

FIG. 3 is a block diagram showing a detailed configuration of each apparatus of the exemplary embodiment 1.

FIG. 4 is a tabulated view showing a formulation of a flow table of a switch according to the exemplary embodiment 1.

FIG. 5 is a sequence diagram illustrating the operation of the exemplary embodiment 1.

FIG. 6 shows two flow tables for the initial stage, with the flow tables being retained by a switch of the exemplary embodiment 1.

FIG. 7 shows two flow tables retained by the switch of the exemplary embodiment 1, with a flow entry subject to a condition(s) having been set.

FIG. 8 shows two flow tables retained by the switch of the exemplary embodiment 1 with the flow entry subject to the condition(s) having been deleted.

FIG. 9 shows two flow tables retained by the switch of the exemplary embodiment 1, with a flow entry subject to a second condition having been set.

Figure 10:
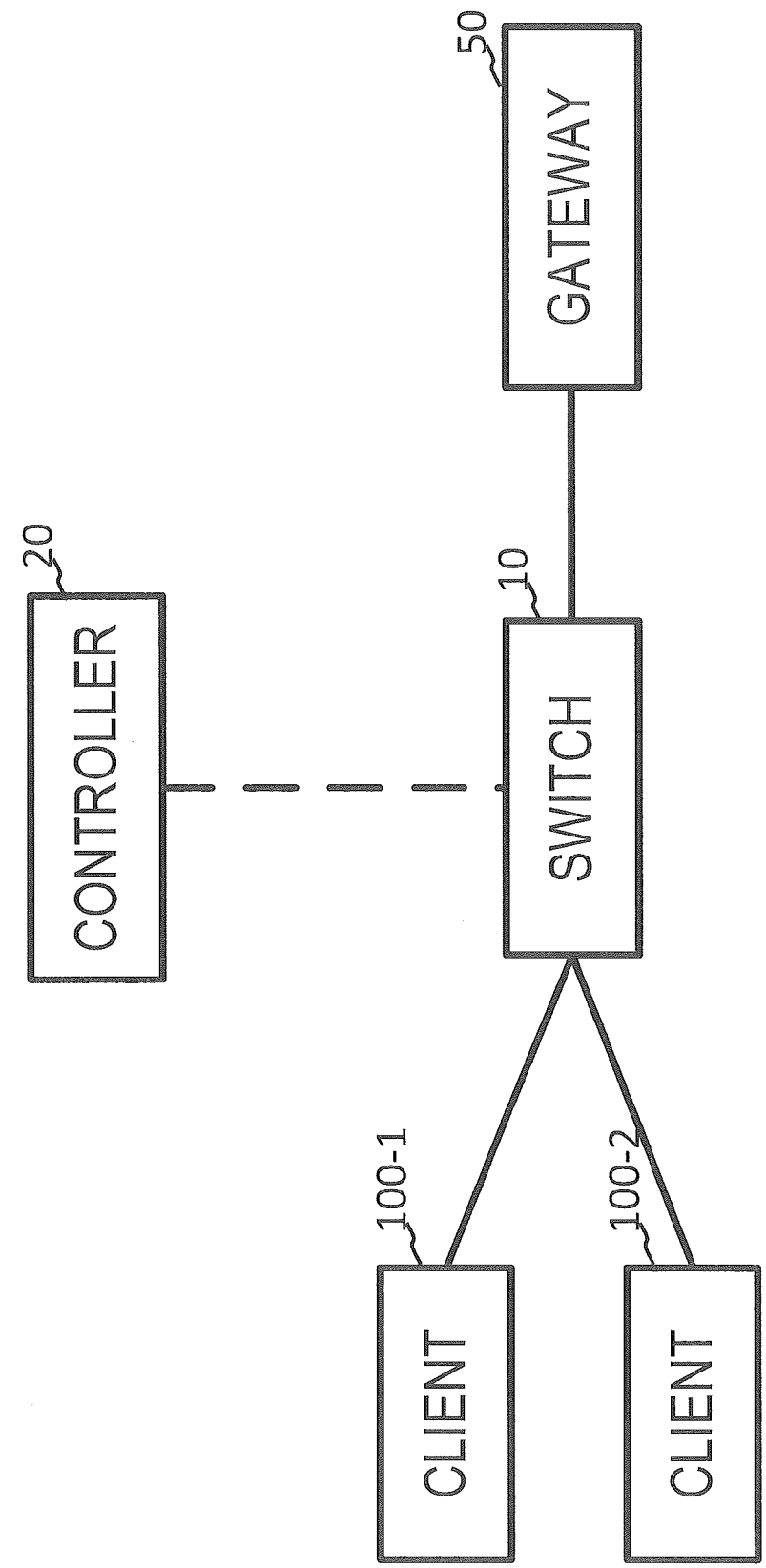

FIG. 10 is a block diagram showing a global configuration of an exemplary embodiment 2.

FIG. 11 is a tabulated view showing a flow table for an initial stage, with the flow tables being retained by a switch of the exemplary embodiment 2.

FIG. 12 is a tabulated view retained by the switch of the exemplary embodiment 2, with flow entries subject to conditions having been set.

PREFERRED MODES

Initially, a summary of an exemplary embodiment will be described. It is observed that symbols used in the summary for reference to the drawings are simply illustrations to assist in understanding and are not intended to limit the present disclosure to the modes illustrated.

In an exemplary embodiment, such a configuration is provided which comprises a communication apparatus 10A and a control apparatus 20A, as shown in FIG. 1. The communication apparatus 10A selects, among a plurality of control information pieces, such a control information piece matching a received packet and having the match condition highest in a priority level, and processes a received packet based on the selected control information piece. The control apparatus sets the above mentioned control information pieces in the communication apparatus 10A.

More specifically, the control apparatus 20A includes a control unit 21A that sets the above mentioned multiple control information pieces in the communication apparatus 10A, and a control information generation unit 22A. The control information generation unit generates a plurality of control information pieces having match conditions overlapping at least partially with one another and also having respective different ranks in a priority level as well as respective different processing contents. The communication apparatus 10A modifies the control information piece highest in a priority level among the plurality of control information pieces based on a modifying condition(s) which may be pre-defined on control information piece basis. Among examples of the pre-defined modifying conditions, there may be time-out by lapse of a preset time duration as from the time of setting or as from the last time of execution of the flow entry. The communication policies may thus be changed over without the control apparatus 20A monitoring the communication apparatus 10A.

It is noted that the control information piece highest in the priority level among the plurality of control information pieces may be modified by deleting the control information piece(s) higher in ranking in the priority level, rewriting the priority level itself or modifying the storage position of the flow entry in case the storage position indicates the ranking in the priority level.

The modifying condition(s) may be set by the control apparatus 20A in a one-for-one correspondence to each control information piece. Or, the flow entry aging processing function provided on the communication apparatus 10A may be used. In this case, the control apparatus 20A may set a flow entry instructing header rewriting in a communication apparatus further upstream than the communication apparatus 10A to create a situation of not hitting on the control information piece highest in ranking of the priority level, thereby producing the aging.

First Exemplary Embodiment

An exemplary embodiment 1 in which the present disclosure is applied to policy switching in an access control system will now be explained. FIG. 2 depicts a block diagram showing the global configuration of the exemplary embodiment 1. Referring to FIG. 2, there is shown a configuration in which clients 100-1, 100-2, a quarantine system 30 and a firewall 40 are interconnected by a switch(es) 10 which is equivalent to the above mentioned communication apparatus.

The switch 10 and the quarantine system 30 are connected via a control network, indicated by a broken line, to a controller 20 equivalent to the above mentioned control apparatus. The control information may be exchanged between the controller 20 and the switch 10 and between the quarantine system 30 and the controller 20.

The clients 100-1, 100-2 may be personal computers, tablet terminals or mobile terminals belonging to the same segment and capable of communicating with one another.

In the following explanation, the configuration shown in FIG. 2 is used. However, the present disclosure is not limited to e.g., the particular numbers of the clients 100-1, 100-2 or the switches 10 shown in FIG. 2.

The detailed configurations of the components shown in FIG. 2 will now be detailed. FIG. 3 shows the configurations of the functions of the switch 10, controller 20 and the quarantine system 30.

The switch 10 includes a switch processing unit 11, a flow table 12, a controller interface 13 and a flow entry deletion management unit 14.

The controller interface 13 is connected to the controller 20 via a control network to exchange the control information with the controller 20. For example, the controller interface 13 operates for supplementing, modifying or deleting a flow entry in the flow table 12 under instructions from the controller 20.

On receipt of a packet from outside, the switch processing unit 11 retrieves a flow entry, having the match condition matching the header information of the incoming packet, from the flow table 12, and executes the processing provided for in the flow entry retrieved. Examples of the processing include rewriting a specified field(s) of a header of the incoming packet or packet outputting at a specified port(s).

In the flow table 12, there is stored a flow entry stating the match condition and the contents of processing (actions) to be executed on the flow identified by the match condition. The match condition is specified by combinations of the input port number of the packet and the information obtained from the packet header. Examples of the information include a MAC (Media Access Control) address, an IP (Internet Protocol) address and the TCP (Transmission Control Protocol) port number. The actions may include modifying the priority level of the processing in the switch processing unit 11, applying bandwidth limitations or dropping packets in addition to the above mentioned rewriting of the packet header or packet outputting at the specified port(s). The flow table 12 may include a plurality of the flow entries.

FIG. 4 shows a schematic formulation of the flow table 12. The flow table differs from those of the Non Patent Literature 1 or 2 in that each flow entry of the flow table includes a condition for its deletion.

It is possible for the switch 10 to hold a plurality of flow tables 12 shown for example in FIG. 4. As an action for the case of match to the flow entry, control can be transferred to different flow tables (see '4.1.1 Pipeline Processing' of Non Patent Literature 2). If there is no flow entry that matches the incoming packet in the flow table, the switch 10 can drop the packet or forward it to the controller 20. Either operation may be set on the switch under instructions from the controller 20. In the subject exemplary embodiment, there are two flow entries, as shown in FIGS. 6 to 9, in which the switch 10 is set so that, if there is no flow entry matching the packet in the first flow table, the packet will be forwarded to the controller 20.

Further, the priority level is set in each flow entry. If there is a plurality of flow entries that matched a flow, the flow entry higher in the priority level is applied. It is to be understood that, in the explanation to follow, the higher the vertical position of a given flow entry in the flow table, the higher is the priority level of such flow entry.

The flow entry deletion management unit 14 checks to see if any of the flow entries meets the flow entry deletion condition. If any given one of the flow entries meets the condition, such flow entry is deleted.

It is noted that the above mentioned switch 10 may be implemented by supplementing the function equivalent to that of the flow entry deletion management unit 14 to e.g., the OpenFlow switch of the Non Patent Literatures 1, 2.

The controller 20 is made up of a switch control unit 21, a flow entry information transforming unit 22, a policy management unit 23, a topology management unit 24 and a quarantine system control unit 25.

The switch control unit 21 is equivalent to the above mentioned control unit 21A and instructs the switch 10 to supplement, modify or delete a flow entry in the flow table 12. The switch control unit 21 also operates as a communication interface that receives a packet forwarded to the controller when the flow entry having the match condition matching the received packet has not been found in the switch 10.

The flow entry information transforming unit 22 is equivalent to the above mentioned control information generation unit 22A, and formulates a flow entry to be set in the switch 10, based on the header information of the packet delivered from the switch 10 to the switch control unit 21, the policy information owned by the policy management unit 23, and on the topology information owned by the topology management unit 24.

The communication policy information, as valid in the system, is stored in the policy management unit 23. In the following explanation of the subject exemplary embodiment, it is assumed that a network administrator has stored, in the policy management unit 23, the following communication policies:

(1) The traffic from a client, who has not been quarantined, is forwarded to the firewall and receives security check; if the traffic has not been dropped in the firewall, it is allowed to communicate with another client;

(2) however, provided that, if a preset time, assumed to be time T1, has passed without the client not being quarantined, communication of the client with other than the quarantine system is inhibited;

(3) a client who has been quarantined is allowed to communicate directly with another client for a preset time, assumed here to be time T2; after lapse of the preset time, the client is treated in the same way as the client who has not been quarantined.

In the topology management unit 24, there is stored the information regarding the clients, the switch(es) and the quarantine system present in the system, as well as the address information thereof and the information regarding their interconnections.

The quarantine system control unit 25 is notified from the quarantine system 30 that the quarantining processing for the client has come to a close.

The above mentioned controller 20 may be implemented e.g., by the OpenFlow controller of Non Patent Literatures 1, 2 additionally provided with the function of generating a flow entry which is subject to deletion under a preset condition for deletion. The control information may be exchanged between the controller 20 and the switch 10 using, for example, the OpenFlow protocol as disclosed in Non Patent Literatures 1, 2.

The quarantine system 30 includes a quarantine processing unit 31 and a controller interface 32.

The quarantine processing unit 31 has the function to decide on possible accessibility by having communication with a quarantine program that performs security check on the clients 100-1, 100-2. The quarantine processing unit 31 is a system element well-known in the art and hence is not here explained in detail.

The controller interface 32 notifies to the controller 20 that the client has passed the quarantine.

It is noted that the respective units (processing means) of the respective apparatuses shown in FIG. 3 may be implemented by a computer program that allows the above mentioned processing operations to be executed using the computer's hardware.

The operation of the subject exemplary embodiment will now be detailed with reference to the drawings. In the explanation to follow, such a case where the communication control policies (1) to (3) are applied to the client 100-1, will be taken as an example.

FIG. 5 depicts a sequence diagram showing the operation of the exemplary embodiment 1. First, the client 100-1 transmits a packet to the client 100-2 (step S001). The packet, sent from the client 100-1, has the sending source MAC address of the client 100-1 and a destination MAC address of the client 100-2. When the packet is received by the switch 10, its switch processing unit 11 extracts the header information from the packet, and retrieves the flow entry, having the match condition matching the header information, from the flow table 12, in order to decide on the forwarding destination.

FIG. 6 shows flow tables 12-1, 12-2 retained by the switch 10 at this time instant. In the flow table 12-1, which is the first flow table, just a flow entry f0 which performs a flow table jump on receipt of a packet from a firewall egress is recorded. In the flow table 12-2, which is the second flow table, there are registered flow tables f01 to f03 that forward the packet in accordance with the destination MAC addresses. It is noted that, in FIGS. 6 to 9, an asterisk (*) denotes arbitrary (wildcard).

The switch 10 that received a first packet from the client 100-1 forwards the packet from the client 100-1 to the controller 20, because the flow entry 12-1 of FIG. 6 lacks in the flow entry having the match condition matching the packet from the client 100-1 (step S002).

The controller 20 forms, in its flow entry information transforming unit 22, a flow entry to be set in the switch 10, based on the information regarding the sending source MAC address information, contained in the header of the packet forwarded from the switch 10, and on the information contained in the policy management unit 23 (step S003).

The controller 20 sends out the flow entry, formed as above described by the switch control unit 21, to the switch and instructs the switch to add the flow entry to the flow table 12-1 (S004).

FIG. 7 shows the flow tables 12-1, 12-2 following the addition of the flow entry by the controller 20. In the example shown in FIG. 7, flow entries f1 to f3, in which the MAC address of the client 100-1 has been set as the sending source MAC address of the match condition, are added. Also, among these flow entries, in the flow condition f1, a condition for deletion stating that the flow entry shall be deleted after lapse of time T1 is set.

As from the time the above mentioned flow entries f1 to f3 are set, the packets from the client 100-1, delivered from that time on, match the flow entry f1 and are forwarded to the firewall 40, where the security check is carried out (steps S005, S006). When the packet, which has passed through the firewall 40, is forwarded to the switch 10 (step S007), the packet matches the flow entry f0 of the flow table 12-1 of FIG. 7, so that control transfers to the flow table 12-2 which is the second flow table. The switch 10 references the flow table 12-2 and processes the packet, already checked for security by the firewall 40. As a result, the packet is forwarded to the client 100-2 (step S008). By the above, the communication policy (1) has been applied.

The switch 10 continues with the processing of forwarding based on the flow tables 12-1, 12-2. The flow entry deletion management unit 14, which is kept in operation, checks to see if the condition for deletion is met for each flow entry of the flow tables. If the condition is met, the flow entry in question is deleted. This checking processing can be carried out by running a task which sequentially scans the total of the flow entries at a preset period, though not in a restrictive meaning. In the subject exemplary embodiment, if it is confirmed that the preset time T1 has passed, the flow entry deletion management unit 14 deletes the flow entry f1 in a step S009 in accordance with the condition for deletion of the flow entry f1 corresponding to the above mentioned policy (2). It is noted that the processing in confirming the condition for deletion (time) for each flow entry by the flow entry deletion management unit 14 can be implemented using the timeout value shown as specifications in Non Patent Literature 2 (Hard Timeout). The timeout value can be set in each flow entry. It is also possible to execute the step of the switch 10 notifying to the controller 20 that the entry in question has been deleted.

FIG. 8 shows states of the flow tables 12-1, 12-2 after deletion of the flow entry f1. After the deletion of the flow entry f1, the switch forwards the packet from the client 100-1, addressed to the quarantine system, to the quarantine system, in accordance with the flow entry f2. The switch drops the packets, addressed to other than the quarantine system, in accordance with the flow entry f3.

In this manner, the communication policy, applied to the client 100-1, can be changed to the policy (2), based only on the processing in the switch, without the controller 20 supervising the state of policy application to the individual clients or monitoring the switch.

The client 100-1, now unable to communicate with other than the quarantine system, executes the quarantine program in order to have communication with the quarantine system, and informs the quarantine system 30 of the end of quarantining (step S010 to S011). The quarantine system 30 confirms that quarantining of the client 100-1 has come to a close and notifies that effect to the controller 20 via the controller interface 32 (step S012 to step S013).

On receipt of the above notification by the quarantine system control unit 25 of the controller 20, the flow entry information transforming unit 22 generates a flow entry f4 corresponding to the policy (3). The controller 20 instructs the switch 10 to delete the flow entries f2, f3 and to add the flow entry f4 in their stead (S014 to S015).

FIG. 9 shows the flow tables 12-1, 12-2 following the addition of the flow entry f4 thereto. From the time of the addition on, a packet from the client 100-1 matches the flow entry f4 in the switch 10, and control transfers to the flow table 12-2, so that forwarding of the packet to the client 100-2 is allowed (step S016 to S017).

After confirming that the time T2 has passed, the flow entry deletion management unit 14 deletes the flow entry f4. This causes reversion of the flow table to the status of FIG. 6. The communication as from the time of lapse of the prescribed time T2 is inhibited to enable realization of the communication policy (3).

It is noted that, in the subject exemplary embodiment, the controller interface 32 is added to the pre-existing quarantine system 30 to provide access control operatively linked to the quarantine system 30. It is however also possible to get the quarantine processing unit 31 built into the inside of the controller 20.

In the subject exemplary embodiment, described above, in which a flow entry is set in each switch at the outset, an operation equivalent to policy switching may be accomplished without the necessity for the controller 20 to monitor the status of each switch. In other words, the monitoring processing on the part of the controller is distributed to the switches, and hence the processing load as well as the monitoring load, imposed on the controller, may be lessened. This also improves system scalability.

Second Exemplary Embodiment

An exemplary embodiment 2, in which the present disclosure is applied to traffic control in the bandwidth control system, will now be explained. FIG. 10 depicts a global configuration of the exemplary embodiment 2. Referring to FIG. 10, there is shown a configuration in which the clients 100-1, 100-2 and a gateway 50 are interconnected via a switch 10. The following explanation is centered about points in which the subject exemplary embodiment differs from the exemplary embodiment 1.

The clients 100-1, 100-2 communicate with an external network via the gateway 50.

The controller 20 also connects to the switch 10 via a control network indicated by a broken line. The controller 20 and the switch 10 are able to exchange the control information with each other via the control network.

The following description is based on the configuration of FIG. 10. It is noted however that the present disclosure is not restricted to e.g., the number of the clients 100-1, 100-2 or that of the switches shown in FIG. 10.

The configuration of the switch 10 is similar to that of the exemplary embodiment 1 and hence is not explained. It is noted however that the switch 10 retains just one flow table (see FIGS. 11 and 12).

The configuration of the controller 20 is also similar to that of the exemplary embodiment 1, except that, since the quarantine system 30 is not provided, the quarantine system control unit 25 is dispensed with. That is, the controller 20 of the subject exemplary embodiment includes a switch control unit 21, a flow entry information transforming unit 22, a policy management unit 23 and a topology management unit 24.

In the following explanation of the subject exemplary embodiment, it is assumed that a network administrator has stored, in the policy management unit 23 of the controller 20, the following bandwidth control communication policies:

(2-1) The client 100-1 may limitlessly use the bandwidth up to a preset value of the amount of cumulative communication to external networks per unit time, which is here set at B1 bytes;

(2-2) from that time on, as long as the cumulative amount of communication from the client 100-1 to the external networks per unit time exceeds B1 bytes and not exceeds B2 bytes, there is imposed a limitation to the maximum bandwidth, this maximum bandwidth being S1 bps;

(2-3) if the cumulative communication amount from the client 100-1 to the external networks per unit time exceeds B2 bytes, there is imposed a further limitation to the maximum bandwidth usable until a preset time, set at T3, is elapsed, this maximum bandwidth being S2 bps, where S1>S2; in addition, the processing priority level of the switch processing is set lower than a usual value;

(2-4) the client 100-2 is not subject to the above mentioned limitations (2-1) to (2-3) and is free to communicate with the external network.

The operation of the subject exemplary embodiment will now be explained with reference to the drawings. If, in FIG. 10, the client 100-2 has made a request for communication to the gateway 50, the sending source MAC address of a packet sent out from the client 100-2 is the client 100-2, while its destination MAC address is the gateway 50.

FIG. 11 shows a flow table 12 retained by the switch 10 at this time instant. In the example shown in FIG. 11, there are set flow entries f11, f12 that allow communication between the clients 100-1 and 100-2 and that from the gateway 50 to the clients 100-1 or 100-2, and a flow entry f13 that allows communication from the client 100-2 to the gateway 50. It is noted that, in FIG. 11, 12, an asterisk (*) again denotes arbitrary (wildcard).

The switch 10 thus forwards a packet from the client 100-2, addressed to the gateway 50, to the gateway 50 in accordance with the flow entry f13 of the flow table 12. This operation is equivalent to the above mentioned policy (2-4).

Such a case where the client 100-1 has made a communication request to the gateway 50 will be explained. The packet sent out from the client 100-1 has a sending source MAC address of the client 100-1 and a destination MAC address of the gateway 50. Since there is no flow entry in the flow table 12 that matches the packet, the switch 10 forwards the packet to the controller 20.

In the flow entry information transforming unit 22, the controller 20 generates a flow entry, based on the sending source MAC address information, contained in the header of the packet forwarded from the switch 10, and on the information in the policy management unit 23.

FIG. 12 shows a state in which there are added the header information of a packet from the client 100-2 to the gateway 50 and flow entries f5 to f7 generated based on the above mentioned communication policies (2-1) to (2-3). The flow entry f5 corresponds to the communication policy (2-1) stating that there is no bandwidth limitation as long as the cumulative communication volume to the external network per unit time is not up to the preset volume, which is here set at B1 bytes. The flow entry f6 corresponds to the communication policy (2-2) stating that communication is allowed under the bandwidth limitation of S1 bps as long as the cumulative communication volume to the external network per unit time exceeds B1 bytes and is not up to B2 bytes. The flow entry f7 corresponds to the communication policy (2-3) stating that, if the cumulative communication volume to the external network per unit time exceeds B2 bytes, communication is allowed only during a preset time duration, here set at T3, subject to bandwidth limitation of S2 bps. It is noted that, again in this exemplary embodiment, the higher the vertical location of a flow entry in question in the priority level in the flow table, the more preferentially the flow entry is to be applied.

If once the flow entries f5 to f7, shown in FIG. 12, are set in the switch 10, the packet addressed to the gateway 50 from the client 100-1 matches one of the flow entries, herein the flow entry f5, highest in the priority level among the flow entries having the same match conditions, and is accordingly forwarded to the gateway 50. This is an operation in keeping with the communication policy (2-1).

As in the exemplary embodiment 1, the switch 10 confirms, in its flow entry deletion management unit 14, whether or not the conditions for deletion are met for respective flow entries in the flow table, by way of a parallel operation to the forwarding processing which is performed in accordance with the flow table. If it has been confirmed that there is the flow entry that satisfies the conditions for deletion, the flow entry deletion management unit 14 deletes the flow entry. In the subject exemplary embodiment, the flow entry deletion management unit 14 deletes the flow entry f5 at a time instant the cumulative number of bytes of the packets that matched the flow entry f5 has reached B1 bytes. It is noted that the processing of confirming the cumulative number of bytes in each flow entry by the flow entry deletion management unit 14 may be implemented by referencing the flow statistic information (Counters). The Counters, recorded in a one-for-one correspondence to the flow entries, are defined as specifications in Non Patent Literature 2. It is possible for the switch 10 to execute here the step of notifying the controller that the entry in question has been deleted.

When the flow entry f5 has been deleted, the packet addressed to the gateway 50 from the client 100-1 now matches the flow entry f6, out of the flow entries having the same match conditions, which is now highest in the priority level. Hence, the switch 10 applies bandwidth limitations of up to S1 bps in the switch processing unit 11, and accordingly forwards the packet to the gateway 50.

Subsequently, at a time instant when the cumulative number of bytes of the packets, which matched the flow entry f6, has reached B2 bytes, the flow entry f6 is deleted.

When the deletion of the flow entry f6 is completed, the packet addressed to the gateway 50 from the client 100-1 matches the flow entry f7, out of the flow entries having the same match conditions, which has become highest in the priority level. The switch 10 thus applies the bandwidth limitation of up to S2 bps in the switch processing unit and accordingly forwards the packets to the gateway 50. On the other hand, the switch 10 sets the priority level of switch processing so as to be lower than a usual value in the switch processing unit 11 and accordingly forwards the packet. In this manner, the communication policies in the switch 10 may be switched from the communication policy (2-1) to the communication policy (2-2) and then to the communication policy (2-3).

The flow entry f7 is set so as to be deleted if time T3 has elapsed as from a time instant when the packet that matched the match condition for the first time has been received. If the flow entry f7 is finally deleted, the flow table 12 reverts to the same state as the initial state shown in FIG. 11.

As described above, the present invention can be applied not only to switching of the communication policies that provide for access limitations, as in the exemplary embodiment 1, but also to dynamic switching of the communication policies that provide for e.g., bandwidth limitations.

Although preferred exemplary embodiments of the present invention are shown above, the present invention is not limited to the above described exemplary embodiments and may be subject to further changes, substitutions or adjustments without departing from its scope. For example, the present invention can be applied to such control in which the first and second exemplary embodiments are combined together so that the access limitations are dynamically switched to the bandwidth limitations and vice versa.

In the above described exemplary embodiments, modifying the flow entry highest in the priority level is by deleting the flow entries. Alternatively, the order of storage of flow entries can be modified. For example, movement of the flow entry f1 in FIG. 7 to the lower most end of the flow entry array has the same effect as deleting the flow entry f1. In addition, if the information on the priority level is explicitly donated to each flow entry, it is possible to rewrite the priority level information.

The disclosures of the above mentioned Patent Literatures and Non Patent Literatures are to be incorporated herein by reference. The particular exemplary embodiments or examples may be changed or adjusted within the gamut of the entire disclosure of the present invention, inclusive of claims and drawings, based on the fundamental technical concept of the invention. Moreover, a variety of combinations or selection of elements herein disclosed (elements of claims, exemplary embodiments, Examples and drawings) may be made within the concept of the claims of the present invention. Viz., the present invention may include a variety of changes or corrections that may occur to those skilled in the art in accordance with the total disclosures inclusive of the claims and the drawings as well as the technical concept of the invention. It is to be understood that those terms expressed in singular forms also represent those in plural forms as well, bearing in mind that no distinction is made between singular and plural forms in the Japanese context.

REFERENCE SIGNS LIST 10 switch
10A to 10C communication apparatuses
11 switch processing unit
12, 12-1, 12-2 flow tables
13 controller interface
14 flow entry deletion management unit
20 controller
20A control apparatus
21 switch control unit
21A control unit
22 flow entry information transforming unit
22A control information generation unit
23 policy management unit
24 topology management unit
25 quarantine system control unit
30 quarantine system
31 quarantine processing unit
32 controller interface
40 firewall
50 gateway
100-1, 100-2 clients
F0 to f7, f01 to f13 flow entries

What is claimed is:

1. A control apparatus, comprising:
a control information generation unit that generates a plurality of control information pieces having match conditions overlapping at least partially one with another, a ranking in a priority level different one from another and processing contents different one from another; and
a control unit that sets the plurality of control information pieces in a communication apparatus; the communication apparatus selecting, among the plurality of control information pieces, the control information piece matching a packet received and having the match condition highest in a priority level; the communication apparatus processing a received packet based on the selected control information piece; wherein,
the control apparatus causes the communication apparatus to modify the control information piece, highest in a priority level, among the plurality of control information pieces, based on a modifying condition set in advance on the control information piece basis, whereby switching is made from one of communication policies to another; and
wherein,
the control information generation unit generates, in accordance with a communication policy that, if preset time has elapsed as from a time of occurrence of communication between given hosts, a forwarding destination of a packet is to be modified,
a first control information piece that forwards a packet between the given hosts, with the preset time as a time period of validity, and
a second control information piece lower in the priority level than the first control information piece; the second control information piece forwarding, after lapse of the preset time, a packet having another forwarding destination as an address, to the another forwarding destination.

2. The control apparatus according to claim 1, wherein, the control apparatus causes the communication apparatus to delete the control information piece, among the plurality of control information pieces, which is highest in the priority level, when the modifying condition has become valid, so as to modify the control information piece highest in the priority level among the plurality of control information pieces.

3. The control apparatus according to claim 1, wherein, when the modifying condition has become valid, the control apparatus causes the communication apparatus to rewrite the priority level of the plurality of control information pieces so as to modify the control information piece highest in the priority level among the plurality of control information pieces.

4. The control apparatus according to claim 1, wherein, a third control information piece to drop a packet addressed to other than the another forwarding destination is generated.

5. The control apparatus according to claim 1, wherein, the control information generation unit generates, in accordance with a second communication policy that, in communication between preset hosts, bandwidth limitation is to be applied in dependence upon a traffic volume,
a third control information piece that forwards a packet to an address thereof as long as the traffic volume is less than a first threshold value; and
a fourth control information piece that, when the traffic volume is equal to or greater than the first threshold value, forwards a packet to the address thereof by applying a preset bandwidth limitation.

6. A communication apparatus, comprising:
a packet processing unit that selects, among a plurality of control information pieces, such control information piece matching a packet received and having a match condition highest in a priority level; the packet processing unit processing a received packet based on the selected control information piece; and
a control information piece management unit that, based on a condition specified in advance by a control apparatus, modifies the control information piece, among the plurality of control information pieces, which is highest in a priority level, whereby switching is made from one of communication policies to another;
wherein,
the control information generation unit generates, in accordance with a communication policy that, if preset time has elapsed as from a time of occurrence of communication between given hosts, a forwarding destination of a packet is to be modified,
a first control information piece that forwards a packet between the given hosts, with the preset time as a time period of validity, and
a second control information piece lower in the priority level than the first control information piece; the second control information piece forwarding, after lapse of the preset time, a packet having another forwarding destination as an address, to the another forwarding destination.

7. A method for communication, comprising:
generating a plurality of control information pieces having match conditions overlapping at least partially one with another, a ranking in a priority level different one from another and processing contents different one from another;

setting the plurality of control information pieces in a communication apparatus; the communication apparatus selecting, among the plurality of control information pieces, the control information piece matching a packet received and having the match condition highest in a priority level; the communication apparatus processing a received packet based on the selected control information piece; and specifying, for the communication apparatus, in advance, a condition to modify the control information piece having a highest priority level among the plurality of control information pieces;

wherein, the control information generation unit generates, in accordance with a communication policy that, if preset time has elapsed as from a time of occurrence of communication between given hosts, a forwarding destination of a packet is to be modified, a first control information piece that forwards a packet between the given hosts, with the preset time as a time period of validity, and a second control information piece lower in the priority level than the first control information piece; the second control information piece forwarding, after lapse of the preset time, a packet having another forwarding destination as an address, to the another forwarding destination.

8. A non-transitory computer-readable recording medium storing a program that causes a computer loaded on a control apparatus; the control apparatus controlling a communication apparatus; the communication apparatus selecting, among a plurality of control information pieces, such control information piece matching a packet received and having a match condition highest in a priority level, and processing a received packet based on the selected control information piece; to execute a processing of:

generating the plurality of control information pieces having match conditions overlapping at least partially one with another, a ranking in a priority level different one from another and processing contents different one from another;

setting the plurality of control information pieces in the communication apparatus; and specifying, for the communication apparatus, in advance, a condition to modify the control information piece having a highest priority level among the plurality of control information pieces, whereby switching is made from one of communication policies to another;

wherein, the control information generation unit generates, in accordance with a communication policy that, if preset time has elapsed as from a time of occurrence of communication between given hosts, a forwarding destination of a packet is to be modified, a first control information piece that forwards a packet between the given hosts, with the preset time as a time period of validity, and a second control information piece lower in the priority level than the first control information piece; the second control information piece forwarding, after lapse of the preset time, a packet having another forwarding destination as an address, to the another forwarding destination.

9. A non-transitory computer-readable recording medium storing a program that causes a computer loaded on a communication apparatus; the communication apparatus having a packet processing unit; the packet processing unit selecting, among a plurality of control information pieces, such control information piece matching a packet received and having a match condition highest in a priority level, and processing a received packet based on the selected control information piece; to execute a processing of:

storing the plurality of control information pieces received from the control apparatus; and modifying the control information piece, among the plurality of control information pieces, which is highest in a priority level, based on a condition specified in advance from the control apparatus;

wherein, the control information generation unit generates, in accordance with a communication policy that, if preset time has elapsed as from a time of occurrence of communication between given hosts, a forwarding destination of a packet is to be modified, a first control information piece that forwards a packet between the given hosts, with the preset time as a time period of validity, and a second control information piece lower in the priority level than the first control information piece; the second control information piece forwarding, after lapse of the preset time, a packet having another forwarding destination as an address, to the another forwarding destination.

* * * * *